United States Patent [19]

Frye et al.

[11] 4,014,245
[45] Mar. 29, 1977

[54] FASTENER

[76] Inventors: John S. Frye, 3098 Trafalgar Way, Chamblee, Ga. 30341; James B. Fuss, 3245 Enon Road, Atlanta, Ga. 30349

[22] Filed: May 28, 1975

[21] Appl. No.: 581,700

[52] U.S. Cl. .................................. 85/5 P; 29/526
[51] Int. Cl.² ...................................... F16B 19/00
[58] Field of Search ............ 29/509, 526, 513, 522; 85/5 R, 5 P, 1 L; 52/758 F

[56] References Cited
UNITED STATES PATENTS

| | | | |
|---|---|---|---|
| 2,077,120 | 4/1937 | Lombard | 85/5 P UX |
| 2,105,706 | 1/1938 | Stamy | 85/5 R |
| 2,244,976 | 6/1941 | Tinnerman | 85/5 R X |

*Primary Examiner*—Charlie T. Moon
*Attorney, Agent, or Firm*—Newton, Hopkins & Ormsby

[57] ABSTRACT

A fastener is disclosed for fastening together two sheets of metal having mutually aligned apertures defined by generally annular walls having a plurality of radially spaced notches therein. The fastener comprises a metallic tube having a plurality of outwardly projecting tabs positioned along chord extensions of the tube and sized to be seated in the aperture defining wall notches of the two sheets and bent off the chord extensions of the tube into locking engagement with the aperture defining wall notches to fasten the two sheets of metal to the fastener and thereby to each other.

A method is also disclosed for fastening together two sheets of metal. The method comprises the steps of cutting similarly sized and configured apertures into the two sheets of metal with the aperture defining wall of each sheet formed with a plurality of radially spaced notches. The two sheets of metal are stacked together with the aperture defining walls of each sheet in mutual register. A tubular fastener having a plurality of outwardly projecting tabs is inserted into the two sheets of metal apertures. The tubular fastener is then rotated relative to the two sheets of metal thereby forcing the plurality of tabs into locking engagement with the two sheets of metal.

4 Claims, 14 Drawing Figures

FASTENER

BACKGROUND OF THE INVENTION

This invention relates generally to fasteners, and particularly to methods and means for fastening together two sheets of metal.

Accordingly, general objects of the invention are to provide improved means and methods for fastening together two or more sheets of metal.

More specifically, it is an object of the present invention to provide a fastener for fastening together two sheets of metal, which fastener is relatively simple and economic to manufacture.

Another object of the invention is to provide a fastener which is relatively simple and economic to use in fastening two sheets of metal together.

Another object of the invention is to provide a fastener of the type described capable of fastening two sheets of metal tenaciously together and with minimal risk of subsequently becoming unfastened.

Yet another object of the invention is to provide a method for fastening together two sheets of metal which method is relatively fast, simple and economic to practice.

SUMMARY OF THE INVENTION

In one form of the invention a fastener is provided for fastening together two sheets of metal having mutually aligned apertures defined by generally annular walls having a plurality of notches therein. The fastener comprises a metallic tube having a plurality of outwardly projecting tabs positioned along chord extensions of the tube and sized to be seated in the aperture defining wall notches of the two sheets and bent off the aforesaid chord extensions of the tube into locking engagement with the aperture defining wall notches to fasten the two sheets of metal to the fastener and thereby to each other.

In another form of the invention a method is provided for fastening together two sheets of metal. The method comprises the steps of cutting similarly sized and configured apertures into the two sheets of metal with the aperture defining wall of each sheet formed with a plurality of radially spaced notches. The two sheets of metal are stacked together with the aperture defining walls of each sheet in mutual register. A tubular fastener having a plurality of outwardly projecting tabs is inserted into the two sheets of metal apertures. The tubular fastener is then rotated relative to the two sheets of metal to force the plurality of tabs into locking engagement with the two sheets of metal.

DETAILED DESCRIPTION OF THE DRAWING

Figure 1:
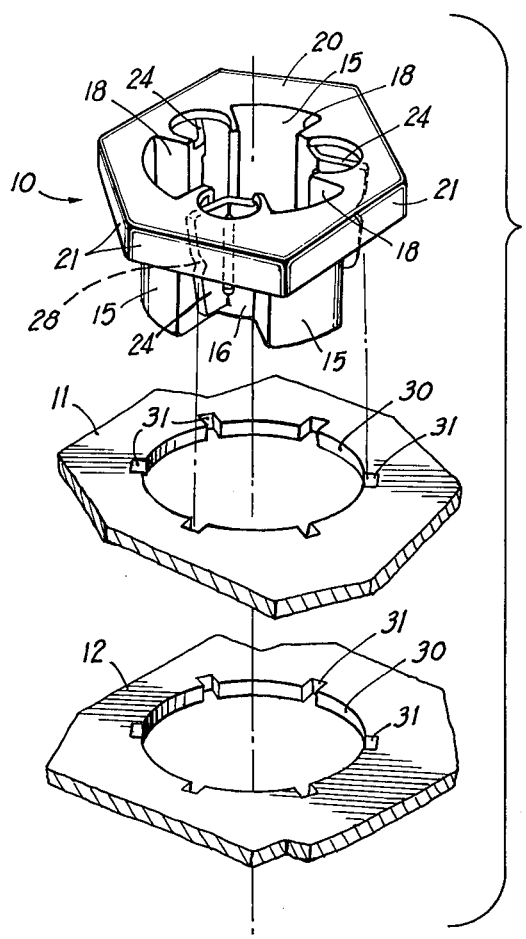
FIG. 1 is a perspective view of a fastener embodying principles of the present invention in one preferred form shown positioned for attachment to two sheets of metal to fasten them together according to a method of the invention.
Figure 2:
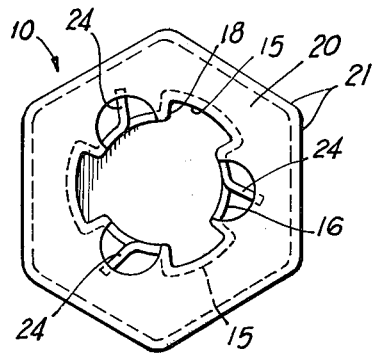
FIG. 2 is a plan view of the fastener shown in FIG. 1.

Referring now in more detail to the drawings, there is shown in FIGS. 1–5 a fastener 10 for fastening together two sheets of metal 11 and 12 with a planar surface of each in mutual abutment. The fastener is preferably formed from a sheet of hard metal and thus is after formation of unitary material construction generally in the shape of a tube. In the embodiment here illustrated, the fastener is seen to include three, radially spaced, cylindrical segments 15 joined together by three, radially spaced, cylindrical segments 16. The three segments 15 are of substantially identical radius as are the three cylindrical segments 16. The radius of segments 15 however is seen to be greater than the radius of the segments 16. The two sets of cylindrical segments are unitarily joined together by radial bridges 18. A polyangular planar flange 20 extends from an end of cylindrical segments 15 from the periphery of which a five sided rim 21 depends. Semicircular segments are cut from that portion of flange 20 which otherwise would overlap cylindrical segments 16 to receive a Spanner type wrench as hereinafter explained.

Figure 3:
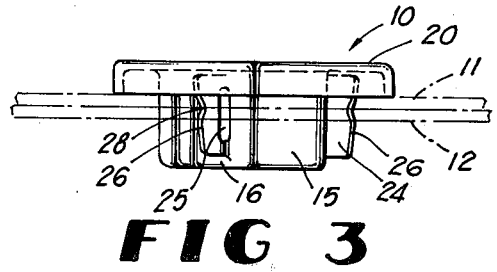
FIG. 3 is a side elevational view of the fastener shown in FIGS. 1 and 2.
Figure 4:
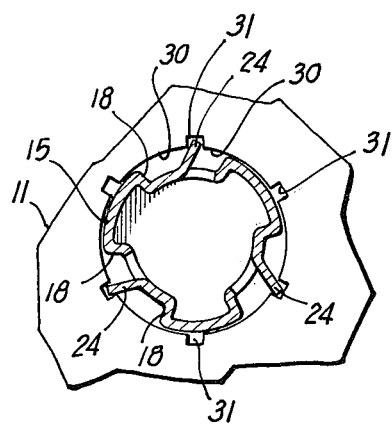
FIGS. 4 and 5 are sequential views of the bottom of the fastener illustrated in FIGS. 1–3 shown disposed within mutually aligned apertures of two sheets of metal to be fastened together, which views illustrate a sequence of operational steps performed in fastening the sheets together.
Figure 5:
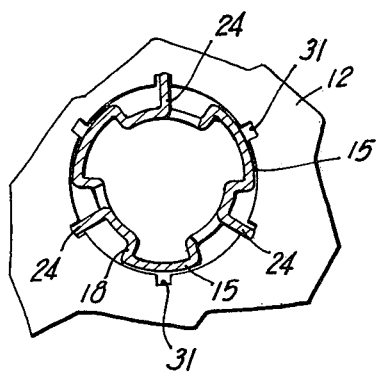

With continued reference to FIGS. 1–5, an upper section of each cylindrical segment 16 is seen to be provided with a tab 24 that is disposed, as shown in FIGS. 1–4, generally along chord extensions of the tube. This is to say that the tabs are turned outwardly at an angle between tangent and normal the cylindrical segment from which it projects. It should be understood, however, that this is not meant to imply that the tubular structure need be cylindrical. As seen in FIG. 3 the junction of tabs 24 with segments 16 are provided with slots 25. The edges 26 of the tabs distal the cylindrical segments 16 are further seen to be provided with an indentation 28 for a purpose hereafter also explained.

To fasten the two sheets of metal 11 and 12 together similarly sized and configured apertures are formed in each of the sheets. Here, the apertures are seen to be circular with the aperture defining walls 30 provided with notches 31 radially spaced from each other. These apertures may, of course, be separately formed in each of the sheets before assembly or formed simultaneously after the two sheets have been placed in mutual abutment. With the sheets of metal 11 and 12 place one upon the other with walls 30 and notches 31 in mutual register fastener 10 is positioned thereabove with the edges of tabs 24 distal the cylindrical segments aligned for entry into notches 31. The fastener is then inserted into the apertures bringing the bottom edge of flange lip 21 atop the sheet of metal 11 with the tabs disposed within notches 21. A Spanner wrench is then placed in gripping arrangement with tabs 24 which are then bent. This causes the fastener to alter its position from that shown in FIG. 4 to that shown in FIG. 5 where it is seen that tabs 24 now take a generally radial orientation. This action forces tab indentations 28 into snug abutment with the walls of the notches. With the tabs so jammed to the notches, the sheets of metal are thereby fastened to the fastener and thus to each other. It should be noted here that the forces of compression are oriented substantially radial and therefore there is not a significant amount of force applied upon the fastener flange.

Figure 6:
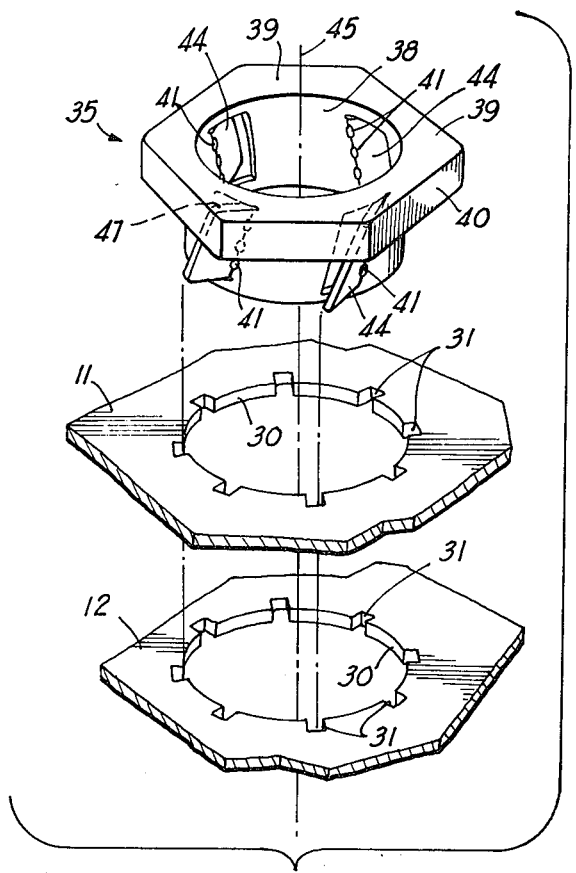
FIG. 6 is a perspective view of a fastener embodying principles of the invention in another form showing positioned for attachment of two sheets of metal together.
Figure 7:
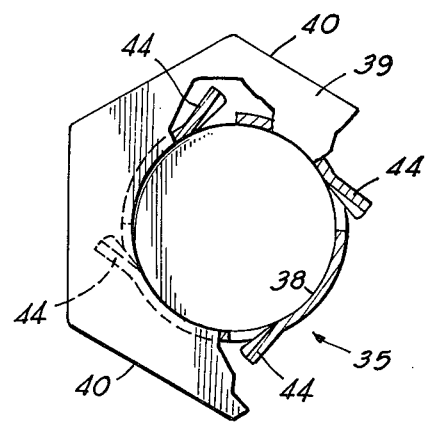
FIG. 7 is a plan view of the fastener shown in FIG. 6.
Figure 8:
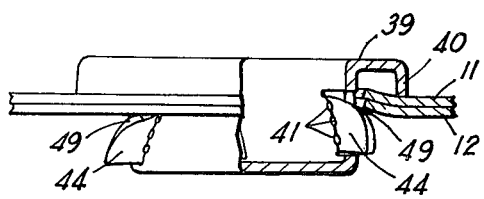
FIG. 8 is a side view, partially in cross-section, of the fastener shown in FIGS. 6 and 7.

Referring next to FIGS. 6-8, a fastener embodying principles of the invention in another form is illustrated. Here, fastener 35 is again shown in position for insertion into aligned apertures in sheets of metals 11 and 12. The apertures are again defined by cylindrical walls 30 having a plurality of radially spaced notches 31 formed therein. Fastener 35 here is generally tubular but in this embodiment the tubular structure is provided by a single, substantially cylindrical wall 38 from the upper end of which radially extends a flange 39 having a polyangular lip 40 depending from the periphery thereof. Wall 38 is provided with four sets of three helically aligned apertures 41. Four tabs 44 extend outwardly from walls 38 joined unitarily thereto at the sets of apertures 41. Inasmuch as the juncture of the tabs with the cylindrical wall is along a line slightly transverse the axis 45 of the tubular wall, a bending of the tabs toward a more radial orientation with respect to the cylindrical wall causes an upper edge 47 thereof to converge towards flange 39.

To fasten sheets of metal 11 and 12 here together with fastener 35, the fastener is again passed through the mutually aligned apertures with a substantial portion of each of the tabs 44 passing through notches 31. Subsequently, a wrench may be placed in gripping engagement about polyangular flange lip 40 and the fastener rotated relative to the sheets of metal. With a portion of tabs locked in the notches resistance will be encountered forcing the tabs to bend to a more radial orientation. Inasmuch as the tabs are hinged along helical lines not parallel with axes 45, this movement of the tabs causes the top surface 49 thereof to move upwardly towards flange lip 40. This convergence tightly sandwiches the two sheets of metal therebetween even distorting them to some degree under the compressive forces involved as seen most clearly in FIG. 8. The two sheets of metal thereby becomes securely fastened to the fastener and to each other.

Figure 9:
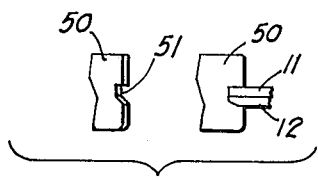
FIGS. 9–14 illustrate various configurations that tab portions of fasteners may take while embodying principles of the invention.
Figure 10:
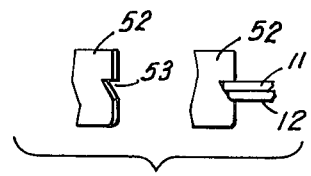
Figure 11:
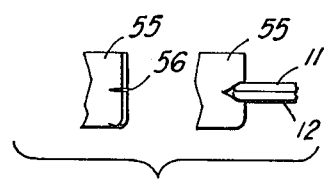
Figure 12:
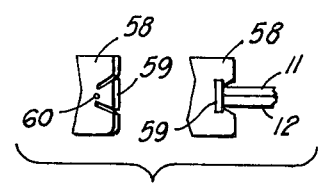
Figure 13:
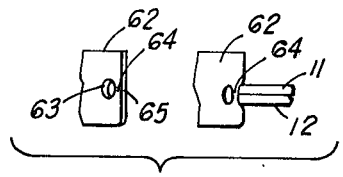
Figure 14:
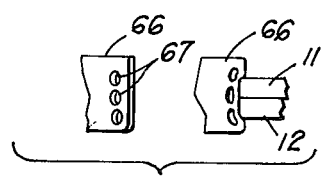

In FIGS. 9-14 various modifications in tab configurations are illustrated. In FIG. 9, for example, tab 50 is seen to be provided with a three sided notch 51 slightly undersized to receive edges of sheets 11 and 12 therein. Following torquing of the tab the sheets become pressfitted therein as shown in the right hand portion of this figure. In FIG. 10 tab 52 is seen to be provided with a two sided notch 53 for receiving sheets 11 and 12. In FIG. 11 tab 55 is provided with a thin slit 56. As this tab is torqued against sheets 11 and 12 the sheets wedge the slit 56 open as the press fit is formed. In FIG. 12 yet another modification of the tab is shown wherein tab 58 is seen to be provided with two convergent slits 59 and the circular hole 60 therebetween. When sheets 11 and 12 are forced thereagainst, the peninsular formed between the two slits is forced outwardly in a tight engagement with the periphery of the sheets. In FIG. 13 tab 62 is seen to be provided with a circular hole 63 which enables a bridge portion 64 between the hole and tab edge 65 to give way to some degree as the sheets are brought into snug engagement with the tab. In FIG. 14 tab 66 is provided with three holes 67 which again enable the metal to give in and receive peripheral edges of sheets 11 and 12 in forming a tight press-fit.

We thus see improved methods and means are here provided for fastening together two sheets of metal. The fastener is relatively simple and economical to manufacture and to use in fastening the sheets together. After fastening, a most tenacious gripping force is applied to the fastener and sheets. While several preferred embodiments have been illustrated herein, it should be understood that these merely serve to illustrate principles of the invention in selected forms. Many modifications, additions or deletions may, of course, be made thereto without departure from the spirit of the scope of the invention as set forth in the following claims.

What is claimed is:

1. A fastener for fastening together two sheets of metal having mutually aligned apertures defined by generally annular walls having a plurality of radially spaced notches therein, said fastener comprising a metallic tube having a plurality of tabs projecting said tube and being substantially axially aligned with said tube and positioned along chord extensions of said tube and of sufficient length to be seated in the aperture defining wall notches of the two sheets and bent off said chord extensions of said tube into locking engagement with the aperture defining wall notches to fasten the two sheets of metal to the fastener and thereby to each other, and wherein said metallic tube is formed with a first set of cylindrical segments of first radius unitarily joined together by a second set of cylindrical segments of second radius smaller than said first radius with said tabs positioned on said second set of cylindrical segments and being of sufficient length to project radially beyond said first set of cylindrical segments when bent.

2. A fastener for fastening together two sheets of metal having mutually aligned apertures defined by generally annular walls having a plurality of radially spaced notches therein, said fastener comprising a metallic tube formed with a first set of cylindrical segments of first radius unitarily joined together by a set of cylindrical segments of second radius smaller than said first radius; and a plurality of tabs projecting outward from said tube and being substantially axially aligned with said tube and positioned along chord extensions of said tube; said tabs being unitarily joined to said second set of cylindrical segments at apertured junctions and of sufficient length to project outwardly beyond said first set of cylindrical segments when bent off said chord extensions of said tube into a locking position whereby said tabs may be bent to engage said sheets of metal at said apertures.

3. A fastener in accordance with claim 2 wherein each of said tabs has an edge distal said apertured junction provided with an indentation positioned to be seated in the aperture defining wall notches of the two sheets of metal.

4. A fastener for fastening together two sheets of metal having mutually aligned apertures defined by generally annular walls having a plurality of radially spaced notches therein, said fastener comprising a metallic tube having a plurality of tabs projecting said tube and being substantially axially aligned with said tube and positioned along chord extensions of said tube and of sufficient length to be seated in the aperture defining wall notches of two sheets and bent off said chord extensions of said tube into locking engagement with the aperture defining wall notches to fasten the two sheets of metal to the fastener and thereby to each other, wherein said metallic tube is formed with a first set of cylindrical segments of first radius unitarily joined together by a second set of cylindrical segments of second radius smaller than said first radius with said tabs positioned on said second set of cylindrical segments and being of sufficient length to project radially beyond said first set of cylindrical segments when bent, and wherein said metallic tube is further provided with a flange extending laterally from coplanar ends of said first set of cylindrical segments.

* * * * *